Sept. 23, 1958  S. R. GITTINS  2,853,352
CABINET
Filed Aug. 3, 1956  2 Sheets-Sheet 1
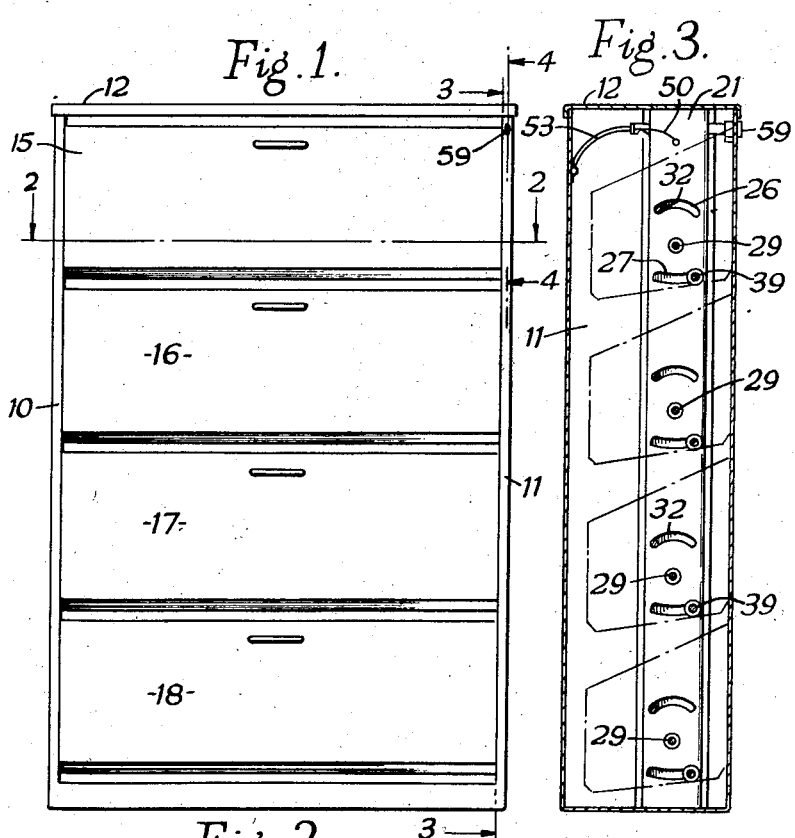
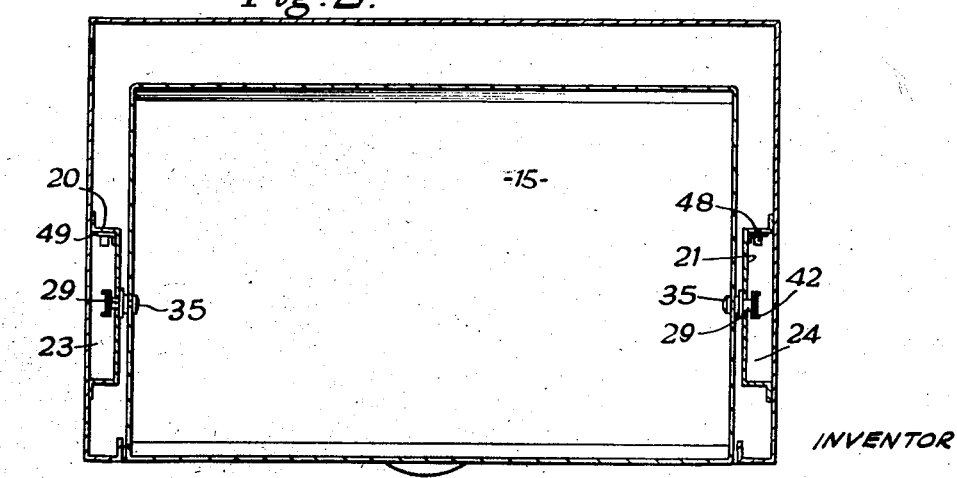
INVENTOR
STANLEY RICHARD GITTINS
BY
Young, Emery & Thompson
ATTORNEYS

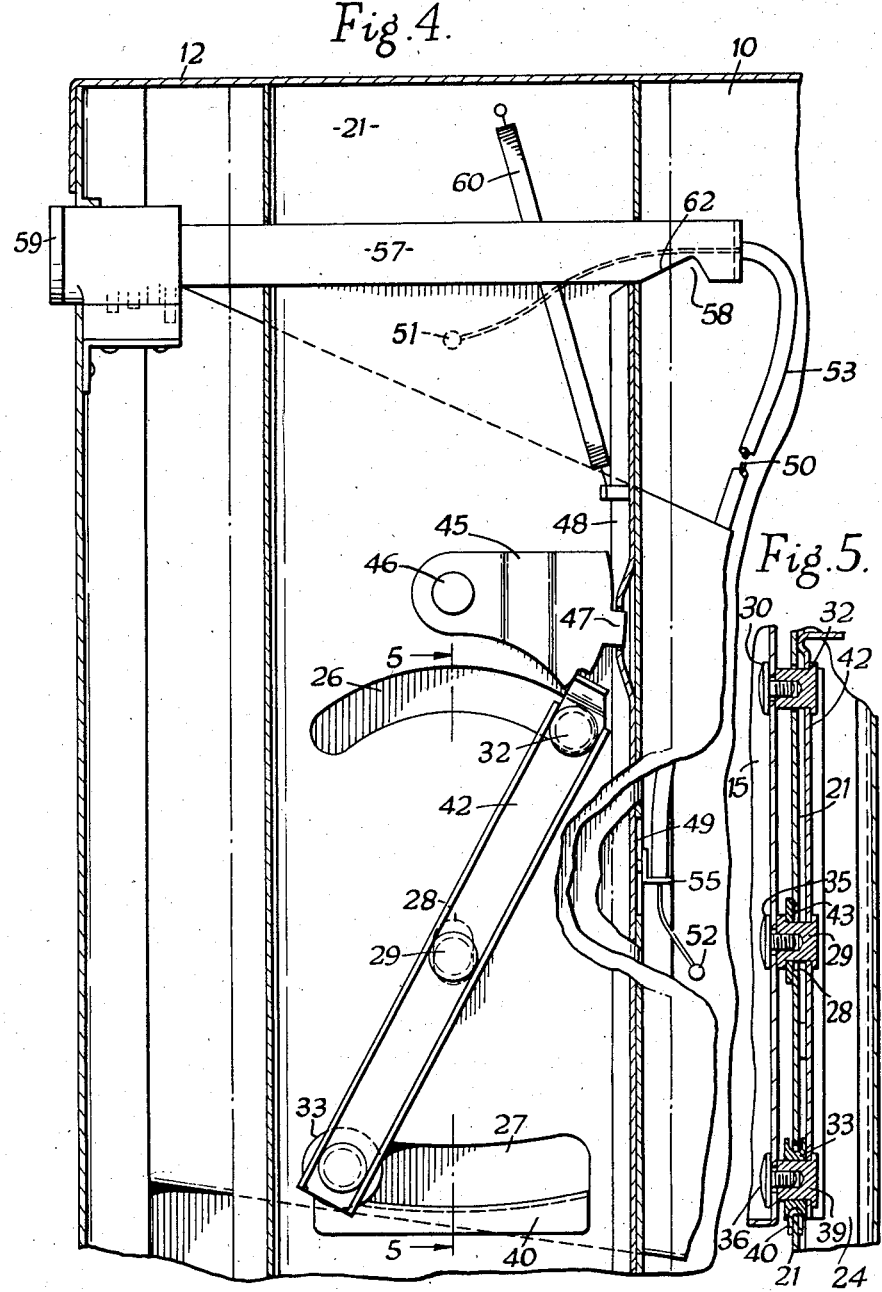

United States Patent Office

2,853,352
Patented Sept. 23, 1958

2,853,352

CABINET

Stanley R. Gittins, London, England, assignor to Tipdex (Holdings) Limited, London, England Application August 3, 1956, Serial No. 601,972

Claims priority, application Great Britain August 11, 1955

5 Claims. (Cl. 312—218)

This invention relates to cabinets for containing articles and more particularly to filing cabinets for containing files of papers. According to the invention described in our Patents Nos. 2,785,036 and 2,779,653 the cabinet comprises filing boxes or like containers disposed one above the other and tiltably mounted in a casing so that they can be opened and closed tiltably, means being provided to limit the opening movement of each box at a position in which the front wall of the box is at an angle to the horizontal.

The main object of the present invention is to provide improved means for mounting the boxes tiltably which means can be easily assembled and will not permit inadvertent displacement of the boxes if the cabinet is turned upside down or to any other position during transport.

According to the present invention a cabinet comprises an outer casing, including side walls, at least one container within the casing, a channel member carried by each side wall of the casing so as to leave a small space within each channel, a bar in each channel, a first projection on each bar between its ends located in an opening in the channel, and other projections on the ends of the bar located in slots in the channel, said bars being fixed on opposite sides of the container, whereby the container pivots around its first projection and its weight is carried by at least one pair of the other projections.

At least two of the slots may be of such shape as to cause the container to be raised from one-sixteenth to five-sixteenths of an inch as it moves from its open and closed positions to its mid-position so as to provide a gravitational assistance to the final opening and final closing of the container, the other slots and said opening being of such shape as to permit such raising of the container.

The invention will now be further described by way of example with reference to the accompanying diagrammatic drawings wherein:

Figure 1 is a front view of a cabinet made in accordance with the invention;

Figure 2 is a sectional view on the line 2—2 on Figure 1;

Figure 3 is a sectional view on the line 3—3 on Figure 1;

Figure 4 is a sectional view on the line 4—4 on Figure 3; and

Figure 5 is a sectional view on the line 5—5 on Figure 4.

A metal casing has side walls 10, 11 and a top 12, and carries four containers 15, 16, 17 and 18.

Two channel members 20, 21 are welded to the inner surfaces of the side walls 10, 11 so as to leave spaces 23, 24 between channel webs and the walls of the casing.

Each channel has four sets of slots and bars, i. e. one set for each container. Each set consists of a pair of curved lateral slots 26, 27 between which is a short vertical slot 28. A pivot pin 29 in the form of a roller slides in the slot 28. A pin 32 and a roller 33 ride in the slots 26, 27 respectively. Studs 30, 35, 36 having their container wall and screw into tapped holes in the pins 29, 32, and in a pin 39 that carries the roller 33. The pins 32, 29, 39 are attached to a bar 42 and form projections carried by the bar.

A bearing plate 40 seats on the edge of the slot 27 and carries the rollers 33 and thereby supports the weight of the container and its contents. The slot 27 and the bearing plate 40 are of such curvature as to serve as a cam to lift the rollers 33 and the container as the latter moves from its closed position to about its halfway position and permit it to fall as it continues its movement so that the weight of the container and its contents assists the latter part of the opening movement. Conversely the bearing plate or cam lifts the container as it moves from its open position to its halfway position whereupon it falls so that the weight assists the latter part of the closing movement. The slots 26, 28 are shaped to permit these movements and to guide and steady the movements.

The weight of the container could alternatively be carried by the lower edge of the slot 26.

The slots permit movement of the boxes through only 40° to 60° so that the front wall of the box when open will be at an angle of 30 to 50° to the horizontal.

At least one pin of each lever may carry a washer 43 on the inside of the casing (outside surfaces of the channels) and the pins are riveted over so that the guide pins and bars are permanently mounted on the channels before the latter are fixed to the casing.

Locking levers 45 are also provided in the channels on each side of the cabinet. Each lever 45 is pivoted at 46 at one end near the side of the channel above the swinging bar 42. The other end of this lever engages the side of the top end of the swinging bar and holds it against movement when the locking lever is moved to its locking position. If any containers are open when the lock is turned to its locking position the containers on closing will raise the locking levers and the latter will drop into locking positions when the boxes close. The locking lever 45 has a tongue 47 that engages in an opening in a vertical bar 48 or 49 (one on each side of the cabinet). The bars 48, 49 are raised by springs to unlock the containers. One of these springs is shown at 60 (Figure 4) and the other spring is not shown but is similar.

For moving the bar 49 down to its locking position a Bowden (registered trademark) wire is provided comprising an inner cable 50 anchored at its ends 51, 52 to the casing and a sleeve 53, the lower end of which engages against a bracket 55 that is attached to the bar 49. The upper end of the sleeve is fixed to a locking bar 57 which can be moved to a locking position as shown in Figure 4 by pressing in a lock 59 or can be released by the lock whereupon it moves to the left so that the lower end of the sleeve 53 is lifted so as to permit the bar 49 to be raised.

For pressing down the bar 48 to its locking position the bar 57 has a notch 58 which is entered by the bar 48 in its raised position but when the bar 57 is moved to its locking position one edge 62 of the notch acts as a cam and presses the bar 48 down.

Instead of the channel members 20, 21 being made separately from the casing they may be made by deforming the casing wall to the required shape.

I claim:

1. A cabinet having an outer casing, including side walls, at least one container within the casing, a channel member carried by each side wall of the casing so as to leave a small space within each channel, a bar in each channel, a first projection on each bar between its ends located in an opening in the channel, said opening permitting some vertical movement of said projection but restricting said projection against movement forwardly and rearwardly, and other projections on the ends of the bar located in slots in the channel, said bars being fixed on opposite sides of the container, whereby the container pivots around said first projection and its weight is carried by at least one pair of the other projections which for this purpose rest on the lower edges of their respective openings, one of said other projections moving rearwardly from a position in front of the first projection to a position rearwardly of said first projection during the opening movement of the container.

2. A cabinet as claimed in claim 1 wherein at least two of the slots are of such shape as to cause the container to be raised from one-sixteenth to five-sixteenths of an inch as it moves from its open and closed positions to its mid-position so as to provide a gravitational assistance to the final opening and final closing of the container, the other slots and said opening being of such shape as to permit such raising of the container.

3. A cabinet as claimed in claim 2 wherein the projections which carry the weight of the container comprise rollers on pins mounted on the bars.

4. A cabinet as claimed in claim 1 wherein a locking lever is pivoted at one end to the channel member and in one position engages the bar to prevent opening of the container, and means are provided for releasing the locking lever.

5. A cabinet as claimed in claim 4 wherein the locking lever is movable by the bar when the container moves to closed position and moves into locking engagement with said bar at the end of the closing movement if said release means is in its non-releasing position.

References Cited in the file of this patent

UNITED STATES PATENTS

| | | |
|---|---|---|
| 1,929,095 | Hutchings | Oct. 3, 1933 |
| 2,070,174 | Pace | Feb. 9, 1937 |
| 2,547,513 | Wikman | Apr. 3, 1951 |

FOREIGN PATENTS

| | | |
|---|---|---|
| 600,331 | Great Britain | Apr. 6, 1948 |